Oct. 27, 1936.                C. E. REED                2,058,627
                           EARTH BORING DRILL
                           Filed Aug. 2, 1934

INVENTOR:
Clarence E. Reed,
BY
ATTORNEYS.

Patented Oct. 27, 1936

2,058,627

UNITED STATES PATENT OFFICE 2,058,627

EARTH BORING DRILL

Clarence E. Reed, Wichita, Kans., assignor to Chicago Pneumatic Tool Company, New York, N. Y., a corporation of New Jersey Application August 2, 1934, Serial No. 738,131

14 Claims. (Cl. 255—71)

This invention relates to earth boring drills of the type employing roller cutters of frusto-conical and cylindrical form for disintegrating the entire area at the bottom of the hole.

An object of the invention is to provide a cutter arrangement which will make a substantially flat bottom bore hole having an inclined portion adjacent the side wall.

Another object is to combine a controlled maximum of efficient tooth slippage on the formations to be disintegrated with a minimum of cutting metal, proportional to the service performed.

A further object is to provide a balanced cutter arrangement for operating in balanced cutting relation.

Other objects will hereinafter appear.

In the drawing showing a preferred embodiment of the invention:

Figure 1:
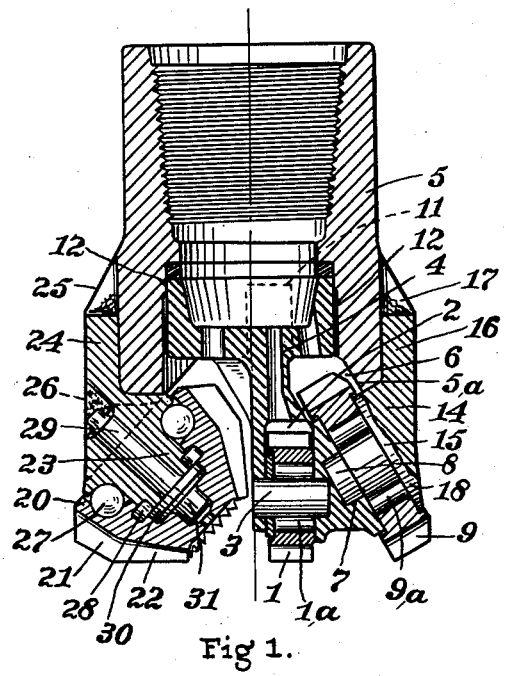
Fig. 1 is an axial sectional view of the drill.
Figure 2:
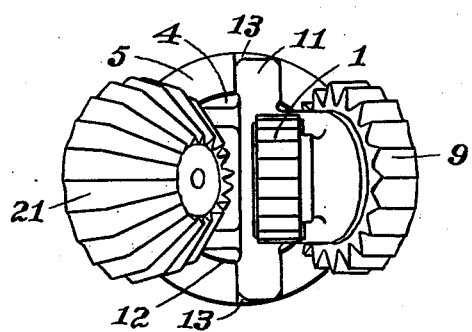
Fig. 2 is a bottom plan view.

The cylindrical cutter 1 for operating on an area at the axial center of the bore hole is mounted on spindle 3 in a downwardly opening recess 2. This spindle 3 is carried by the lower enlarged portion of a carrier 4 mounted at its upper portion in the bit head 5. It will be observed that the carrier has a face lying substantially in the axis of the bit head and an opposite face inclining upwardly toward the bit head axis, the downward divergence of these faces forming the lower enlarged portion of the carrier 4. The inclined side face of the carrier forms a cutter receiving recess 6 within the side of the carrier and this inclined face has a recess 7 for receiving an end of a spindle 8 mounting a side roller cutter 9.

To retain the carrier 4 within the bit head, the upper portion of the carrier is of cylindrical formation having laterally extending lugs 11. This cylindrical portion and lugs are adapted to respectively fit within an axial recess 12 on the underside of the bit head and within notches 13 opening through the side wall of the bit head from recess 12. The lugs 11 may conveniently be welded to the bit head. The upper part of the carrier forms a closure for the central bore through the bit head and has water holes directing the flushing fluid to wash the cutters and the bottom of the hole. Water issuing from one of these holes is directed upon cutter 20 hereinafter mentioned. This water flows along the cutter to thoroughly wash it clean of detritus and then passes beyond the free end of the cutter and impinges upon the hole bottom. The fact that there are no connections at the free end of cutter 20 permits flow of water upon the center of the hole.

The spindle 8 of the side roller cutter 9 has a shank 14 and a flange 15, the inner face of the latter lying spaced from and parallel with the inclined face on the carrier 4, the said flange 15 forming an outer wall for cutter recess 6. Projecting from flange 15 is the inclined spindle 8 which enters and receives support within the recess 7. The spindle shank 14 is affixed to the bit head by means of its upwardly extending portion 16 which lies between wing portions or flanges 17 arranged spaced apart in pairs on the exterior of the bit head and between which the shank is welded. The flange 15 bears against the lower inclined walls 5a of the bit head.

Since the cutter 9 rotatably mounted on the spindle 8 is of cylindrical form and the spindle 8 is inclined, this cutter cuts an inclined area at the side of the bore hole including clearance for the bit head. It is desirable that the lowermost portion of the cutter 9 cut at the same level as the horizontal path cut by the center cutter 1.

It is to be particularly noted that cutters 1 and 9 lie on the same side of the bit head axis and that their axes lie in the same diametrical plane through the bit head axis. On the opposite side of the bit head axis and with its axis lying in the aforementioned diametrical plane is a frusto-conical cutter 20 having two angularly disposed cutting zones 21 and 22. The cutting zone 21 tracks the path cut by side cutter 9 including the bit head clearance, while the cutting zone 22 cuts the area on the bottom of the hole between the areas cut by center cutter 1 and side cutter 9. Cutting zone 22 operates at the level cut by center cutter 1 and as a result nearly the entire area at the bottom of the bore hole is horizontal. The cutter 1 adjacent the vertical axis of the drill has its axis perpendicular to the vertical axis of the drill.

The cutter 20 is supported from the bit head on a spindle 23 having an upwardly projecting shank 24 for welding to another pair of winged portions or flanges 17 on the bit head between which the shank lies. A flange 26 at the base of the spindle seats against an inclined under face of the downwardly projecting wall of the bit head. The spindle 23 provides a raceway for comparatively large diameter balls 27 and a race for roller bearings 28.

Besides their function of reducing friction, bearings 28 serve to retain the cutter 20 on the spindle 23. For this purpose a spindle stem 29 passing through a bore in the main spindle section 23 has another spindle section thereon in the form of a flanged enlargement at 30 against which the flat sides of rollers 28 bear. The stem 29 is welded to the spindle shank at its outer end. The inner end 31 of the spindle is reduced and serves as a friction bearing portion for centering the cutter on the antifriction bearings.

The carrier means for the roller cutters 1 and 9 are assembled in relation to each other for insertion into the bit head as one unit, that is to say, the carrier member 14 is assembled with the carrier member 4 by inserting the spindle 8 with the roller cutter mounted thereon into the recess 7 of the main carrier member 4. The shank portion 16 of the carrier member or bracket 14 extends substantially vertically, as does also the arm or arms 11, connected with the main member 4 of the carrier so that after these two carrier members with their cutters are assembled, the whole assembly can be thrust up into the bit head by a substantially vertical movement, or a movement parallel with the vertical axis of said bit head.

What is claimed is:

1. A roller cutter carrier for an earth boring tool comprising a cylindrical upper portion having laterally projecting lugs and a depending lower portion having a face lying substantially in the axis of said cylindrical portion and a bearing face inclining upwardly toward said axis, the planes of said faces intersecting in a line substantially perpendicular to said axis, said bearing face having a recess therein to receive a cutter spindle, said depending portion having a downwardly opening recess the sides of which form bearing surfaces, said cylindrical portion and lugs providing welding portions remote from the locally hardened bearing surfaces at the lower portion of the carrier.

2. In a roller cutter earth boring drill, the combination of a cylindrical rolling side cutter having a toothed periphery cutting in a zone adjacent the side wall of the bore hole and mounted on an axis inclining downwardly and inwardly towards the vertical axis of rotation of the drill, another cylindrical cutter on the same side of the said vertical axis mounted adjacent the said axis and in a plane substantially parallel therewith, and a roller cutter of frusto-conical form across the said vertical axis having a toothed periphery comprising a base cutting zone inclined to an apex cutting zone thereon, said base zone tracking the same area as the cylindrical side cutter.

3. In combination in a roller cutter earth boring drill, cylindrical side and center roller cutters on one side of the vertical axis of rotation of the drill arranged in balanced cutting relation with a frusto-conical roller cutter of two cutting zones, one zone being a base zone tracking the same area as the cylindrical side cutter, and the other zone cutting the area between the cylindrical side and center roller cutters.

4. In a roller cutter earth boring drill the combination of a carrier comprising a cylindrical upper portion having laterally projecting lugs and a downwardly projecting portion substantially to one side of the vertical axis of rotation of the drill, a cutter recess in the lower face of said downwardly projecting portion and a bearing portion on said projection inclining upwardly and inwardly and having a socket receiving the end portion of a side cutter spindle, and another member mounting a side cutter and a drill head having recesses to receive the said carrier and said member to be welded to the head remote from the cutter bearings.

5. An earth boring drill comprising a bit head, a cutter carrier having an upper portion seated in the bore of the bit head and having arms seated in recesses in the wall of the bit head, said carrier mounting a roller cutter at its lower end and having a bearing face inclined upwardly and inwardly relative to the vertical axis of the drill and having a recess in said face, a side cutter, a spindle therefor having its end seated in the said recess of the said carrier, said spindle having a shank held in a recess of the bit head, substantially as described.

6. A cutter carrier organization for earth boring drills comprising a member having a side face inclined upwardly and inwardly towards the vertical axis of said carrier, an arm projecting laterally from said carrier to fit into a recess in the bit head, said inclined face having a recess therein, a spindle fitted in said recess and inclining upwardly and outwardly in respect to the vertical axis of the carrier, a second member extending upwardly from the outer end of said spindle to fit in a recess in the bit head, and a flange associated with the spindle and second member and lying in a plane substantially spaced apart from and parallel with the inclined face of the member first mentioned to fit a corresponding inclined surface on the bit head, said spindle maintaining a roller cutter between said inclined face and said flange, the organization being insertable into the bit head as one body, substantially as described.

7. In combination in an earth boring tool, a bit head, a toothed side roller cutter and a toothed center roller cutter both disposed on the same side of the bit head axis and having their axes lying in a diametrical plane of the bit head, said side cutter cutting a path including clearance for the bit head, and said center cutter cutting a path only at the center of the hole, said cutters leaving uncut an annular area between their paths, and a frusto-conical roller cutter disposed on the opposite side of the bit head axis from said side and center cutters and said frusto-conical cutter having its axis lying in the diametrical plane of said side and center cutters, said frusto-conical cutter having two angularly disposed cutting zones, one of which cuts the entire area left uncut between the paths of the side and center cutter, and the other of which tracks the path cut by the side cutter.

8. In combination in an earth boring tool, a bit head, a toothed side roller cutter mounted on an axis inclined downwardly and inwardly of the bit head and a toothed center roller cutter mounted on an axis perpendicular to the bit head axis, said cutters being both disposed on the same side of the bit head axis and having their axes lying in a diametrical plane of the bit head, said side cutter cutting an inclined path including clearance for the bit head, said center cutter cutting a horizontal path only at the center of the hole, said cutters leaving uncut an annular area between their paths, and a frusto-conical roller cutter mounted on an axis inclined downwardly and inwardly toward the bit head axis and disposed on the opposite side of the bit head axis from said side and center cutters, the axis of said frusto-conical cutter lying in said diametrical plane of the bit head, said frusto-conical cutter having two angularly disposed cutting zones one of which tracks the inclined path cut by said side cutter and the other of which cuts a horizontal path of the entire annular area left uncut between said side and center cutters.

9. In combination in an earth boring tool, a bit head, a toothed side roller cutter and a toothed center roller cutter, both disposed on the same side of the bit head axis and having their axes lying in a diametrical plane of the bit head, said side cutter cutting a path including clearance for the bit head and said center cutter cutting a path only at the center of the hole, said cutters leaving uncut an annular area between their paths, and toothed frusto-conical roller cutter means disposed on the opposite side of the bit head axis from and having the axis thereof lying in the same diametrical plane of said side and center cutters, said last named cutter means cutting a path including the entire area left uncut by the side and center cutter.

10. The combination according to claim 9 in which said frusto-conical cutter means also cuts a path tracking the path cut by said side cutter.

11. In combination in an earth boring tool, a bit head, a removable cutter carrier having an upper portion mounted centrally on the under side of the bit head and having a lower enlarged portion, said lower enlargement having a cutter receiving recess therein opening downwardly and having a spindle receiving recess opening laterally, a second cutter carrier having an upper portion removably affixed to the exterior of the bit head independently of the first named carrier and having a lower portion from which a spindle projects laterally and inwardly of the bit head, the inner end of said spindle seating within said spindle recess and roller cutters upon said spindles, said carriers with their spindles and cutters being insertable into and removable from the bit head as a unit.

12. In combination in an earth boring tool, a bit head, a cutter carrier having an upper portion secured against the under side of the bit head and having a lower enlarged portion disposed substantially entirely to one side of the bit head axis and having an outer face inclined upwardly and inwardly of the bit head, said enlarged portion having a vertically extending cutter receiving recess therein opening downwardly and having a spindle receiving recess in its inclined face, and a second cutter carrier having an upper portion removably affixed to the exterior of the bit head and a lower portion having an inner face spaced from and parallel to said inclined face and from which a spindle projects downwardly and inwardly of the bit head, the inner end of said spindle seating within said spindle recess.

13. In combination in an earth boring tool, a bit head, a support depending from the central part thereof and disposed entirely to one side of the bit head axis, a spindle wholly carried by said support in a recess in the lower part thereof and a cutter rotatably mounted on said spindle and cutting an area at the center of the hole, a second cutter support depending from the side of the bit head on which said central support is disposed and from which a spindle projects inwardly into supporting engagement with the central support, a cutter rotatably mounted on the last named spindle for cutting an area at the side of the hole, and a cutter support depending from the side of the bit head opposite from the side from which the second named cutter depends, a spindle wholly supported by and projecting inwardly from said last named support and a cutter rotatably mounted on the last named spindle and leaving an unobstructed passageway between the central support and the last named cutter, said tool having a flushing fluid port directing fluid upon the last named cutter and through said unobstructed passageway upon the hole bottom, the axes of both of the said cylindrical cutters being in the same vertical plane passing through the vertical axis of the drill.

14. A cutter assembly for earth boring drills comprising a hanger having means at its upper portion for attachment to a bit head, the lower portion of said hanger having cutter supporting means for rotatably mounting a center roller cutter and having an outer side face with a spindle receiving recess therein, a side cutter spindle having its inner end seated in said recess, a support connected to the outer end of said side spindle and extending upwardly independently of said hanger for attachment to a bit head, and roller cutters on said cutter supporting means and spindle, said assembly being attachable to or removable from a bit head as a unit and being retained in assembled relation by attachment of said support and hanger to a bit head, the axes of both of the said cylindrical cutters being in the same vertical plane passing through the vertical axis of the drill.

CLARENCE E. REED.